Sept. 24, 1929. A. A. BLOMFELDT ET AL 1,729,202
HEATING APPARATUS
Filed April 29, 1927
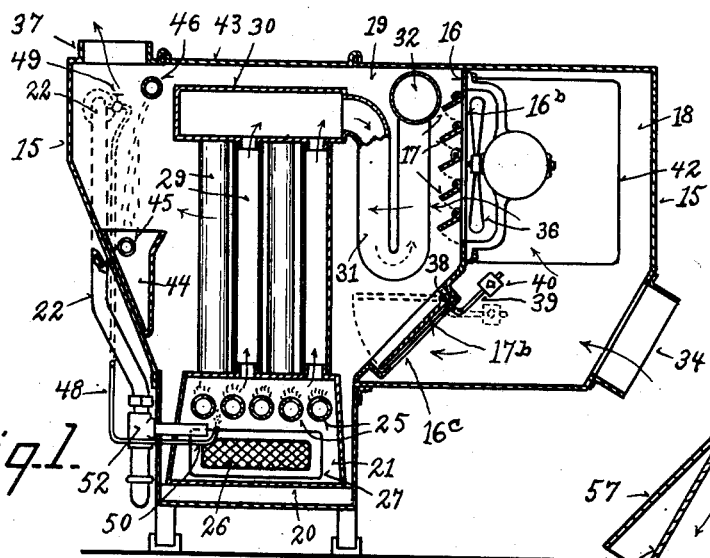
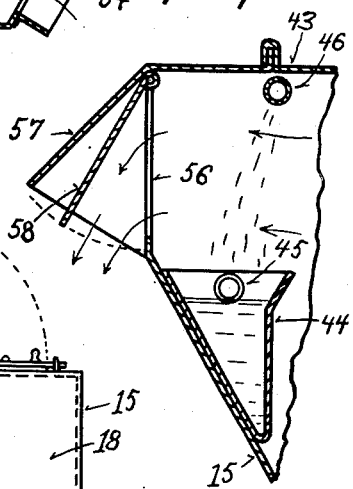
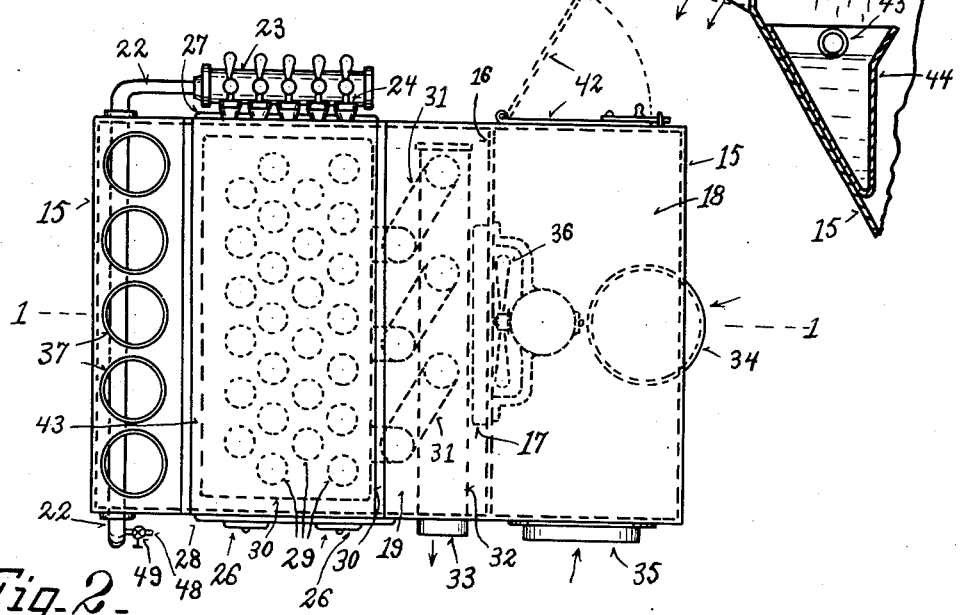
Inventors,
Allen A. Blomfeldt and
William E. Teklenburg,
By C. W. Miles,
Attorney.

Patented Sept. 24, 1929

1,729,202

UNITED STATES PATENT OFFICE

ALLEN A. BLOMFELDT, OF NEWPORT, KENTUCKY, AND WILLIAM E. TEKLENBURG, OF CINCINNATI, OHIO

HEATING APPARATUS

Application filed April 29, 1927. Serial No. 187,632.

Our invention relates to improvements in heating apparatus adapted primarily for domestic purposes. One of its objects is to provide an improved heating apparatus adapted to reliably heat a residence with a minimum amount of care and attention. Another object is to provide an improved heater which is practically automatic in operation, and which is at the same time economical of fuel. Another object is to provide an improved forced air circulation heater. Another object is to provide an improved heater which is also adapted to be employed during warm weather to provide and circulate cool air through the building. Our invention also comprises certain details of form and arrangement and combination of components, all of which will be fully set forth in the description of the accompanying drawings, in which;

Fig. 1 is a central vertical section, taken upon line 1—1 of Fig. 2 illustrating a heater embodying our improvements.

Fig. 2 is a plan of the heater shown in Fig. 1.

Fig. 3 is a sectional detail of a modification.

The accompanying drawings illustrate the preferred embodiment of our invention in which 15 represents a sheet metal casing which is divided by a partition 16 having ports or doorways 16$^b$ and 16$^c$ closed by doors 17 and 17$^b$, into a cool air intake compartment 18 and an air heating compartment 19. A heating member 20 is located in the heating compartment and comprises a combustion chamber 21 to which is furnished a supply of fuel and a supply of air to support combustion. We preferably employ gaseous fuel where the same is available, and in which event the gaseous fuel is supplied through a pipe 22 to a header or small storage reservoir 23 from which it is fed through a series of air mixers 24 to a series of perforated or slotted burner tubes 25 located in the combustion chamber 21. Air is also introduced through a screen 26 in door 27 into the combustion chamber in quantity to completely and efficiently consume and utilize the fuel. Located above and leading the products of combustion from the combustion chamber are a series of vertically disposed flues 29, which are preferably arranged in staggered relation across and exteriorly in contact with the current of air to be heated. All of the flues 29, at their upper ends, enter a drum or header 30, the exterior of which is also in contact with the air to be heated. The products of combustion after passing through the header 30 enter one or more preferably a series of conduits 31, which we have shown in the form of downwardly looped conduits or return bends, which at their exit ends are shown connected to a transverse drum or header 32, through the exit end 33 of which the products of combustion, practically exhausted of utilizable heat, are led as waste products to an off-take flue or chimney, not shown.

The air to be heated is introduced either through an intake port 34 which may be supplied with relatively cool air from the room or rooms to be heated or other source, or through a cool air intake port 35 adapted to be directly supplied with cool air from the exterior of the building to be heated. A motor driven fan 36 is mounted in the cool air chamber 18 and is adapted to supply air from the chamber 18 under forced circulation through a port in the partition 16 into the heating compartment 19 so as to create a circulation of air first over the exterior of the conduits 31 and 32 and thence over the exterior of the flues 29, the header 30, and the combustion chamber 21, whereby the air is quickly heated and ready to pass through the exit ports 37 and conduits may be attached thereto leading to the rooms to be heated. The cool air by contacting first with the conduits 31 and 32 serves to extract practically all of the utilizable heat from the products of combustion before they are wasted, thereby rendering the heater very economical in fuel consumption. Below the partition 16 is a door 17$^b$ which is hinged upon a substantially horizontal axis to the partition 16 at 38, and is substantially counterbalanced or counterweighted, by means for instance of weight arm 39 and weight 40 adjustable thereon so as to normally hold said door in the open or dotted line position shown in Fig. 1, in which position the cool air is adapted to enter through both of the ports 34 and 35, under natural draft into the chamber 18, and from chamber 18 to enter chamber 19 through the open door way 16ᶜ of the door 17ᵇ, and after circulating through the chamber 19 to pass out through the exit ports 37 to the rooms to be heated. The above natural circulation of air is only possible while the fan 36 is idle. As soon as the fan 36 is put in motion it creates a forced draft from chamber 18 to chamber 19, thereby creating a higher air presure in chamber 19 than in chamber 18, which increased air pressure in chamber 19 reacts upon the door 17ᵇ and serves to close the door 17ᵇ and to hold it closed as long as the fan 36 is in operation. As soon as the fan 36 is stopped, the door 17ᵇ opens automatically and establishes a natural draft or circulation of air through the chamber 18, which serves to protect the motor of the fan from temperatures high enough to cause injury to the fan motor. A door 42 is provided to give access to the interior of chamber 18 to install and service the fan and motor. A door 43 in the top of the chamber 19 provides for the introduction of the heater element complete through said door 43, and for servicing or replacing the heater.

A tank 44 located within the chamber 19 and in rear of the heater member is adapted to hold water during cold weather, and to supply a limited amount of water vapor to the air passing through the heater chamber 19. The tank 44 is preferably provided with an overflow conduit 45, and a perforated water supply conduit 46 across the chamber 19 may be employed during hot weather to spray water from the conduit 46 through the air of chamber 19 and into the tank 44 to cool the air both by conduction and evaporation of a portion of the water; the fan 36 being employed to create a forced circulation of air through the chamber 19 and thence to the rooms to be cooled. Also where it is desirable to maintain a high degree of humidity in a room, or a uniform degree of humidity in a room for manufacturing or similar purposes, the humidity may be reliably regulated by means of the forced air circulation, the heater member, and the supply of moisture to the air current as above described.

A branch gas conduit 48 supplies gas through a valve 49 to a pilot jet or light 50 to conveniently ignite the gas at the burner tubes 25. A thermostat 52 in control of the main gas supply conduit is adapted to be controlled from one or more of the rooms to be heated by the temperature thereof, to automatically regulate the amount of fuel gas supplied to the burners 25.

The doors or shutters 17 across the fan opening 16ᵇ are gravity actuated to close the opening 16ᵇ when the fan is not in rotation automatically, to thereby prevent heated air returning from the chamber 19 through the port 16ᵇ to chamber 18 to thereby injure fan motor. The door 17ᵇ is gravity actuated to normally keep the port 16ᶜ open, and is closed automatically through the action of the fan thereon when the fan is rotating. Rotation of the fan serves to automatically open the doors 17, and at the same time to close the door 17ᵇ, hence a return of hot air from the chamber 19 to chamber 18 is prevented whether the fan is in operation or not, and a supply current of air from chamber 18 to chamber 19 is maintained through either door 17 or door 17ᵇ at all times.

The major portion of the fan driven air current is substantially horizontally across the vertical flue tubes of the heater member and out through the exit of chamber 19, and provides during the direct passage of the air across the chamber 19 for the abstraction of practically all of the utilizible heat from the heating member and its economizer flue or exchanger 31 and 32, into the air ejected from chamber 19, thereby providing an unusually large supply of heated air from a heater of a given displacement. The humidifier in chamber 19 permits practically any desired degree of humidity to be uniformly maintained in the air current ejected from chamber 19. Also in hot weather, by employing the fan alone, or the fan and humidifier combined, temperatures below the prevailing or outside temperatures may be maintained in the room supplied from the chamber 19.

In the modification Fig. 3, we have shown a heater adapted to be suspended in the upper portion of a large room to heat the air of said room, and in place of a series of off-take hot air flues 37, we provide an air port 56, and preferably a hood 57 to discharge the air downwardly into the lower portion of the room to be heated. We also preferably employ a hinged door 58 of light weight sheet metal, which is gravity actuated to close or partially close the exit port 56 when the circultating fan is not in operation, and which is partly or entirely opened automatically by the fan driven air current, when the fan is in motion.

The apparatus herein shown and described is capable of considerable modification within the scope of the claims without departing from the spirit of our invention.

What we claim is:

1. A heater comprising a heater chamber, a heater member located in said chamber, an air inlet port and an air outlet port to said chamber, an off-take flue acting as a heat economizing member located in said heater chamber and interposed between said heater member and said air intake port and through which the products of combustion are conducted away from said heater member, and a supplementary air intake port located below said air inlet port first named and being adapted to open when said air inlet port first named is closed.

2. A heater comprising a heater chamber, a heater member located in said chamber, inlet and exit ports to lead a current of air through said chamber, an off-take flue acting as a heat economizer member interposed in said air current in advance of said heater member and through which economizer member the products of combustion are conducted away from said heater member, and means to create a forced circulation of air through said chamber, and a supplementary air intake port located below said air inlet port first named and being adapted to open when said air inlet port first named is closed.

3. A heater comprising a heater chamber, a heater member located in said chamber, a conduit through which a forced circulation of air may be supplied to said chamber, a conduit through which a current of air under natural draft may be supplied to said chamber, an air exit port from said chamber, an off-take flue acting as a heat economizing member, located in said chamber in the path of either of said air currents and through which economizer the products of combustion are conducted away from said heater member, means to create a forced air circulation through said forced air conduit, and means to prevent an air circulation in a reverse direction in either of said air supply conduits.

4. A heater comprising a cool air intake chamber, a heater chamber, a partition between said chambers having a forced air port, a motor fan located in said cool air chamber in position to create a forced air current through said forced air port from said cool air chamber to said heater chamber, a door giving access to said cool air chamber to service said motor fan, a cool air port leading to said cool air chamber, and a hot air exit port leading from said heater chamber.

5. A heater comprising a cool air chamber, a heater chamber, a heater member located in said heater chamber, a partition between said cool air chamber and said heater chamber, having a forced air port and a natural draft port adapted to be alternately opened and closed to feed cool air from said cool air chamber to said heater chamber, a hot air exit port leading from said heater chamber, and an economizer off-take flue to conduct the products of combustion away from said heater member, said economizer flue being located in said heater chamber in the path of the air currents from said cool air chamber to said heater member.

6. A heater comprising a cool air chamber, a heater chamber, a heater member located in said heater chamber, a partition between said cool air chamber and said heater chamber having a forced air port and a natural draft port adapted to be alternately opened and closed to feed cool air from said cool air chamber to said heater chamber, means to prevent a reverse air circulation through either of said cool air supply ports from said heater chamber to said cool air chamber, a hot air exit port leading from said heater chamber, and an economizer off-take flue to conduct the products of combustion away from said heater member, said economizer flue being located in said heater chamber in the path of the air currents from said cool air chamber to said heater member.

7. A heater comprising a cool air chamber, an air heating chamber, a partition between said chambers having a forced air circulation port and a natural draft port, a gravity actuated door normally closing said forced air port and adapted to be opened by a forced air circulation from said cool air chamber to said heating chamber, a door in position to close said natural draft port gravity actuated to hold it normally in an open position, said natural draft door being operable by an air current from said heating chamber to said cool air chamber through said natural draft port to close said natural draft port, and means to create a forced air current from said cool air chamber through said heating chamber and to thereby automatically open the door to said forced air port and automatically close the door to said natural draft port.

8. A heater comprising a cool air chamber, an air heating chamber, a partition between said chambers having a forced air circulation port and a natural draft port, a door operable to close said forced air circulation port normally occupying a closed position and adapted to be opened by the action of a forced air circulation from said cool air chamber to said heating chamber, a door operable to close said natural draft port normally held in an open position and operable by an air current from said heating chamber to said cool air chamber to close said natural draft port, and means located in said cool air chamber to create a forced air current through said forced air port to said heating chamber, and to thereby automatically open the door to said forced air port and to automatically close the door to said natural draft port.

9. A heater comprising a cool air chamber, an air heating chamber, a humidor in contact with the heated air escaping from said heating chamber, a partition between said cool air chamber and said heating chamber having a forced air port and a natural draft port, a door operable to close said forced air port normally occupying a closed position and adapted to be opened by the action of a forced air circulation from said cool air chamber to said heating chamber, a door operable to close said natural draft port normally held in an open position and operable by an air current from said heating chamber to said cool air chamber to close said natural draft opening, and means to create a forced air current from said cool air chamber to said heating chamber.

10. A heater comprising a cool air chamber, an air heating chamber, a partition between said chambers having a forced air circulation port and a natural draft port, a door operable to close said forced air circulation port normally occupying a closed position and adapted to be opened by the action of a forced air circulation from said cool air chamber to said heating chamber, a door operable to close said natural draft port normally held in an open position and operable by an air current from said heating chamber to said cool air chamber to close said natural draft port, and means to create a forced air current from said cool air chamber through said heating chamber.

11. A heater comprising an air heater chamber provided with a natural draft air inlet port a forced air inlet port and an air exit port, a heater member located in said chamber and provided with a heater header, an off-take header located in said heater chamber between said air inlet ports and said heater header, a plurality of off-take flues located in said heater chamber and leading from said heater header to said off-take header, a normally open door adapted to automatically close said natural draft air inlet port, a door normally closing said forced draft air inlet port and adapted to be automatically opened by a forced draft through said forced draft inlet port, and means to produce a forced draft through said forced draft inlet port.

12. A heater comprising an air heater chamber provided with a natural draft air inlet port a forced air inlet port and an air exit port, a heater member located in said chamber and provided with a heater header located at the upper end of said heater, an off-take header located in said heater chamber between said heater header and said air inlet ports, and a plurality of return-bend off-take flues leading from said heater header to said off-take header.

13. A heater comprising an air heater chamber having an air inlet port at one side and an air exit port at the opposite side, a heater member located in said chamber and provided with a heater header located at the upper end of said heater, an off-take header located in the upper portion of said heater chamber between said heater member and said air inlet port, and a plurality of return-bend off-take flues leading downwardly from said heater header and upwardly to said off-take header and adapted to exchange heat into the incoming air before the air current reaches said heater member.

14. A heater comprising an air heating chamber provided with a natural draft air inlet port, a forced draft air inlet port, and a warm air exit port, a heater member located in said heater chamber, a normally open door adapted to automatically close said natural draft inlet port, a door normally closing said forced draft inlet port and adapted to be automatically opened by a forced draft through said forced draft inlet port, and means to produce a forced air draft through said forced draft inlet port to thereby open the door to said forced draft inlet port and to automatically close the door to said natural draft inlet port.

In testimony whereof we have affixed our signatures.

ALLEN A. BLOMFELDT.
WILLIAM E. TEKLENBURG.